United States Patent [19]

Sato

[11] Patent Number: 5,042,075
[45] Date of Patent: Aug. 20, 1991

[54] DOCUMENT COMPOSITION APPARATUS WHICH CHANGES AN OUTLINE FONT IN ACCORDANCE WITH LETTER MAGNIFICATION

[75] Inventor: Fumitaka Sato, Tokyo, Japan

[73] Assignee: Kabushiki Kaisha Toshiba, Kawasaki, Japan

[21] Appl. No.: 570,628

[22] Filed: Aug. 21, 1990

[30] Foreign Application Priority Data

Aug. 22, 1989 [JP] Japan .................................. 1-215583

[51] Int. Cl.$^5$ .......................... G06K 9/42; G09G 1/06
[52] U.S. Cl. ...................... 382/47; 340/731; 382/56
[58] Field of Search ............... 382/47, 56; 340/731, 340/728, 750; 358/463, 447, 451

[56] References Cited

U.S. PATENT DOCUMENTS 4,129,860 12/1978 Yonezawa et al. .................. 340/731
4,620,287 10/1986 Yam ..................................... 340/728

OTHER PUBLICATIONS

Peter Karow, "Digital Formats for Typefaces", 1987, pp. 68-101.
Keiichi Yamada et al., "Bezier Curve Fitting to Planer Figures Approximated by Short Line Segment", Information Process Academy Graphic, and Document 38-2 of the CAD Study Group (document of the meeting on May 12, 1989), pp. 1-8.

Primary Examiner—Leo H. Boudreau
Assistant Examiner—Michael R. Cammarata
Attorney, Agent, or Firm—Cushman, Darby & Cushman

[57] ABSTRACT

An outline font formation which when a character is in a regularly-used size, forms a character pattern by approximation with short line segments using an outline font of a first representing mode. When a large character is designated, and the magnification thereof exceeds the limit value, and the character pattern is formed by using an outline of the second representing mode which is able to avoid the deterioration of the quality of the character pattern represented by the first representing mode at the same magnification.

18 Claims, 6 Drawing Sheets

Fig. 3.

* CHARACTER MODIFICATION SETTING *   (CANCEL) (STOP) (EXECUTE)

MAGNIFICATION

| N TIMES IN HORIZONTAL DIRECTION X M TIMES IN VERTICAL DIRECTION | DOUBLE SIZE IN HORIZONTAL DIRECTION | DOUBLE SIZE IN VERTICAL DIRECTION |
| QUADRUPLE SIZE | FULL SIZE | HALF SIZE IN HORIZONTAL DIRECTION | QUARTER SIZE SUPERSCRIPT | QUARTER SIZE SUBSCRIPT |

CHARACTER MODIFICATION

SUPERSCRIPT | SUBSCRIPT | UNDERLINE | RUBY | TABLE OF CONTENTS | INDEX
ITALIC | PRINT ENPHASIZE | PRINT INHIBIT | LOGO | EQUAL SPACE
VERTICAL WRITING INHIBIT

HALF-TONE DOT MESHING

ROTATION  ← ↗ ↑ → ↘ ↓ ↙

CHARACTER STYLE

DOCUMENT COMPOSITION APPARATUS WHICH CHANGES AN OUTLINE FONT IN ACCORDANCE WITH LETTER MAGNIFICATION

BACKGROUND OF THE INVENTION

1. Field of the Invention

The present invention relates to a document composition apparatus which forms character patterns by using outline fonts.

2. Description of the Related Art

In recent years, document composition apparatus which hold the image of the character pattern of a character in the form of a dot pattern, or dot font have been extensively used.

More recently, document composition apparatus that have an outline font function for character patterns, to form higher quality character patterns, have been produced. One of them is a Desk Top Publishing (DTP) device.

In general, a character pattern formed by an outline font can be represented by straight lines and/or curved lines. There have been several methods proposed for representing the shape of a character pattern. One of these is a technique in which both straight line segments and curved segments are approximated by short line segments. Another such method approximates straight line segments by short line segments, and approximates curved portions by fitting a so-called Bezier Curve, which actually is a series of short line segments closely approximating the curve, to the curve. A description of these methods can be found in "Digital Formats for Typefaces" by Peter Karow 1987.

The latter method represents all the shapes of character patterns by approximation, by means of short line segments using the simplest technique and minimizing the amount of complex calculation for the approximation. Therefore, in terms of hardware, an apparatus of such a type is simple and capable of high-speed processes. Thus, formation of the character patterns including enlargement, reduction, rotation, and the like, can be efficiently carried out.

Further, when using the method of approximation in which short line segments are used for the straight line portions and Bezier curves are fitted into the curved portions, a curved portion can be represented accurately by continuously following the change in curvature. Therefore, even if a character is greatly enlarged, a smooth curved line can still be drawn. However, the calculation necessary for fitting Bezier curves into the curve portion is enormous, and much time is required for forming a character pattern, making it difficult to do this in real time.

In this related art, the curved portions have been represented by a particular single method. A different problem occurs with either one of the above-stated methods. In the case of short line segment approximation, the quality of a character deteriorates when the character is enlarged a great amount, or in the case of Bezier curve approximation, much more time is required for fitting the Bezier curve into a curved portion than in the case of short line segment approximation.

SUMMARY OF THE INVENTION

The present invention has been achieved in consideration of the above, and the purpose thereof is to provide a document composition apparatus capable of forming a high quality character at a high-speed over a wide range of character sizes without increasing the amount of font data.

The present invention is a document composition apparatus capable of changing outline fonts in accordance with a character magnification comprising a font memory for storing a character pattern in the form of an outline font in a first representing mode by means of a short line segment approximation, a setting means for setting a character magnification of a character which is the object for forming the character pattern, a determining means for determining whether the character magnification set by said setting means exceeds a predetermined limit value, and a forming means for forming a character pattern corresponding to the character magnification set as above, in accordance with an outline font obtained by converting the curved portion of the outline font of the first representing mode into a mode which follows continuous changes in curvature, when the judgment means judges that the character magnification exceeds the limit value.

As another possible structure of the present invention, there is provided a document composition apparatus capable of changing outline fonts in accordance with a character magnification, comprising: a font memory for storing a character pattern in the form of an outline font of the first representing mode by means of a short line segment approximation; a setting means for setting a magnification of a character which is subjected for forming the character pattern; a character-type identifying means for identifying the type of a character by measuring the amount of curved portion of each character in regard with the outline font of the first representing mode; a limit value setting means for setting the limit value to the first predetermined magnification when the character type identified by the above identifying means includes many curved portions, and to the second predetermined magnification which is larger than the first predetermined magnification in the case of a few curved portions; a character magnification means for determining if the character magnification set by the setting means exceeds the first predetermined magnification limit value or the second predetermined magnification limit value set by the limit value setting means; and a forming means for forming a character pattern corresponding to the character magnification set by the setting means, in accordance with an outline font obtained by converting the curve portion of the outline font of the first representing mode read out from the font memory into the second representing mode represented by following continuous change in curvature, when the determining means determines that the character magnification exceeds the limit value.

BRIEF DESCRIPTION OF THE DRAWINGS

These and other aspects of the invention will now be described in detail with reference to the accompanying drawings, wherein.

DESCRIPTION OF THE PREFERRED EMBODIMENT

Figure 1:
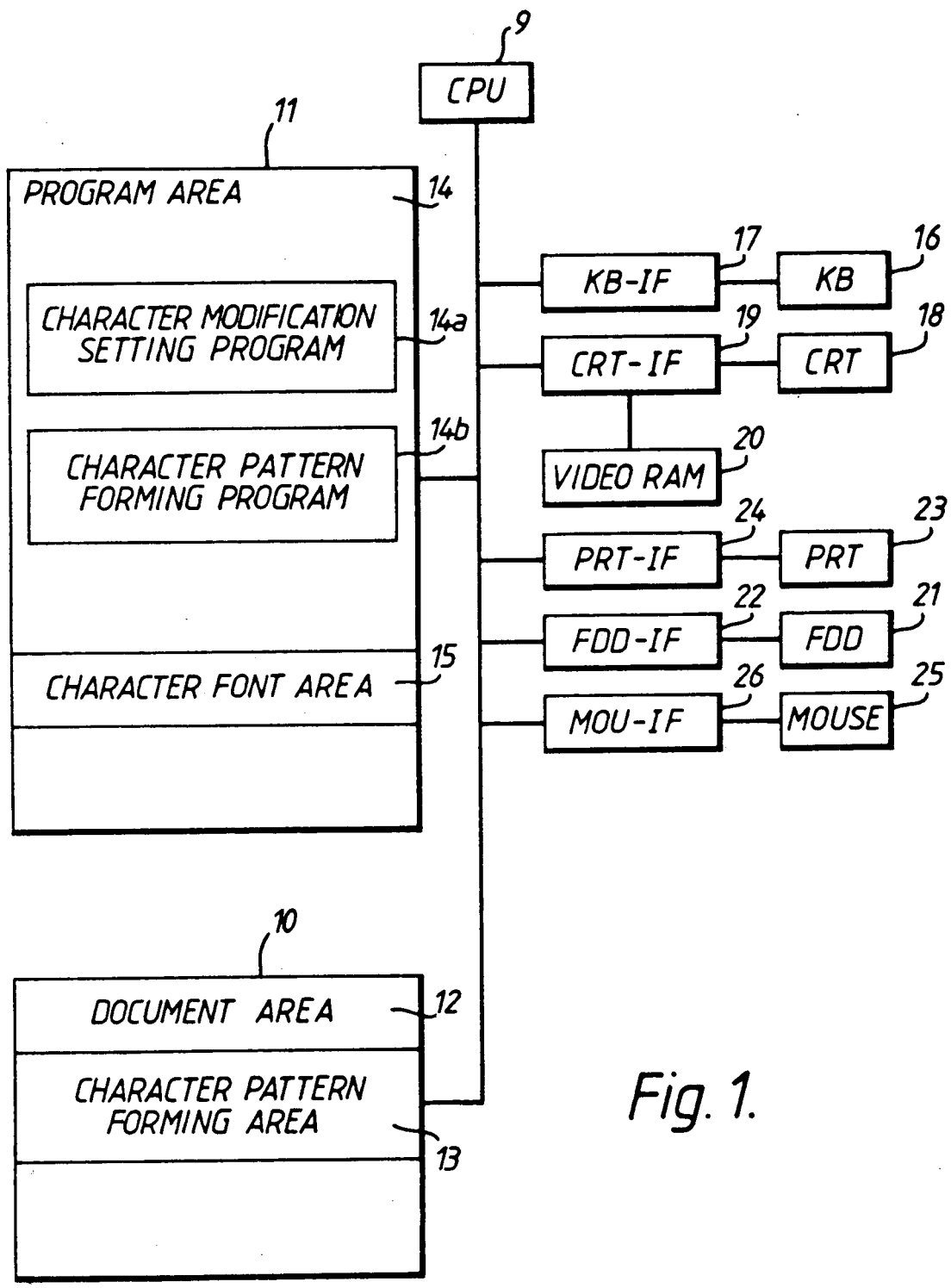
FIG. 1 is a block figure showing the structure of a document composition apparatus embodied according to the present invention.

An embodiment according to the present invention will be described with reference to the figures. FIG. 1 is a block figure showing the structure of the embodiment. In this figure, numeral 9 denotes a central processing unit (to be called CPU hereinafter), which executes the processing in accordance with information contents stored in RAM 10 and ROM 11.

CPU 9, which controls the apparatus as a whole, accesses RAM 10 and ROM 11, and executes a character pattern forming process and the like, in accordance with a document composition process, character modification setting process, and character modification when the program is started by an input instruction. RAM 10 includes document are 12 for storing the document data (character code) formed, character pattern forming area 13 which is an operation area for forming a character pattern in accordance with character modification, etc. ROM 11 also has program area 14 having all the processing programs which determine the operation of CPU 9, and character font area 15 containing font data (outline fonts), a dictionary area (not shown) in which a vocabulary dictionary for checking the spelling of an input word is stored, and the like. Program area 14 contains character modification setting program 14a for setting the properties in relation to the character modification including the character magnification, and character pattern forming program 14b for forming a character pattern in accordance with the contents of the character modification. Further, the outline fonts stored in character font area 15 are obtained by approximating the original shape of a character, including curved sections, represented in, for example, a 200×200 dot size, by means of short line segments.

FIG. 1 shows keyboard 16 (KB), a keyboard interface (KB-IF), display RAM 20, floppy disk device 21 (FDD), FDD interface 22 (FDD-IF), printer 23 (PRT), printer interface 24 (PRT-IFO, mouse 25, and mouse interface 26 (MOU-IF).

KB 16 inputs input data required for forming a document to CPU 9 via KB-IF 17. KB 16 includes character keys, symbol keys, and a cursor key for executing a process which is currently set.

CRT 18 displays a document which is formed, and a menu with a processing step is determined. CRT-CNT 19 controls the display on CRT 18 using display RAM 20 (bit map memory) under the control of CPU 9.

FDD 21 stores a document formed, and the property data such as the character modification, set for a character in the document, and stores information indicative of external characters and the like, under the control of CPU 9, via FDD-IF 22.

PRT 23 executes printing upon reading in a character pattern formed in accordance with character modification based on document data stored in document area 12 via PRT-IF 24.

Mouse 25 is used to instruct the apparatus to execute a particular step by selecting it in the menu displayed on CRT 18, and to determine setting values such as a character magnification by pressing two switches provided thereon. A signal from mouse 25 is input via MOU-IF 26.

Figure 2:
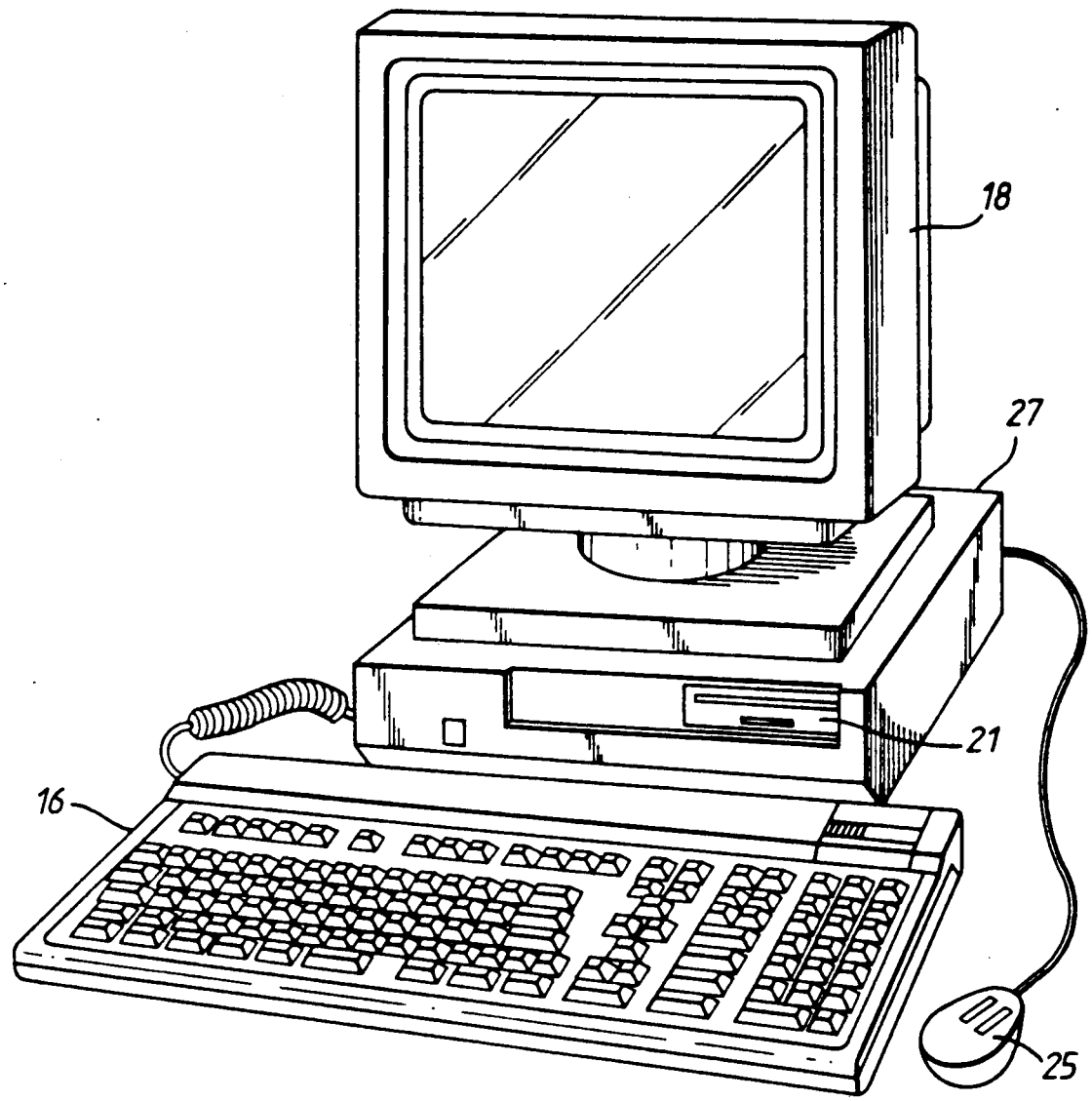
FIG. 2 is an overall view of the document composition apparatus, FIG. 3

FIG. 2 is an overall view of the document composition apparatus of the embodiment. FIG. 2 shows the main body 27 of the document composition apparatus in which all the facilities including the memory devices such as FDD 21, etc., are housed therein. KB 16, CRT 18, and mouse 25 are connected to the main body 30. In this figure, PRT 23 is not shown.

In operation, an instruction for a particular process is carried out by selecting a particular item from the menu displayed on CRT 18 by means of mouse 25. In the case of forming a document, the function is set to the document composition mode, and the actual formation of the document follows keystrokes on KB 16. The document data thus formed is stored in document area 12 in RAM 10.

When performing character modifications and changing the size of a character in the document formed as above, a character (character column) to be subjected to character modification is designated. The item for setting character modification is selected from the menu displayed on CRT 18. When the selection is completed, CPU 9 activates character modification setting program 14a, and the character modification process in accordance with the character modification is stated. First CPU 9 controls CRT 18 to display the icon 30 for setting a character modification as shown in FIG. 3. When an item is selected from the icon shown in FIG. 3, the item designated is inverted on the display. (In the figure, the inverted display is illustrated by slash lines 3!.) Further, if the icon 32 for "EXECUTE" is selected while maintaining the above-stated state, data for the character modification regarding the item displayed inverted is determined. The data for the character modification thus determined is stored in an area for storing property data in document area 12 in such a manner that the data can be referred to while corresponding it to the character code subjected to the character modification.

Figure 4:
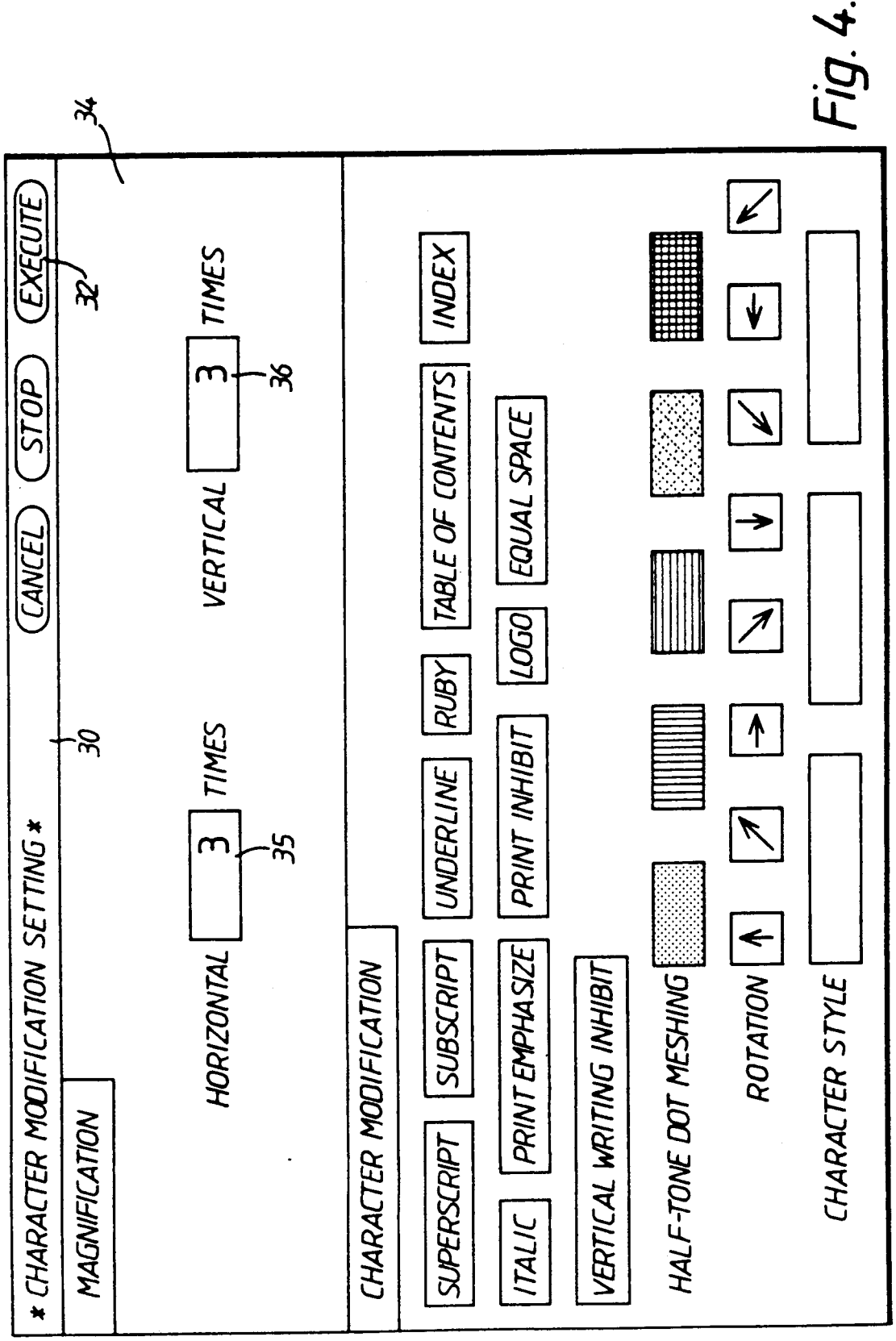
FIG. 4 shows examples of icons displayed on the CRT.

For example, when the size of a character is to be changed, the icon 33 for "n times in horizontal direction X m times in vertical direction" is selected. This selection causes display of a detailed menu 34 for setting the character magnification as shown in FIG. 4.

While the detailed menu for setting the character magnification is being displayed, the cursor can be moved to the magnification setting section 35,36 (horizontal and vertical) by operating mouse 25. CPU 9 changes the numbers displayed in the magnification setting sections 35 and 36 responsive to mouse operation. For example, while the cursor is located in the magnification setting section, the numbers indicating a magnification (for horizontal and vertical directions) are increased when the left switch of mouse 25 is pressed, and increased when the right switch is pressed. Then, the "EXECUTE" icon 32 is selected, to set the horizontal and vertical magnifications. After that, CPU 9 stores the data for the set character magnification values in the area for storing property data within document area 12, corresponding to a character set to indicate magnification of that character set. The character whose character magnification is determined is then displayed on CRT 18 in accordance with the set magnification. The character displayed on CRT 18 is of a character pattern which is formed by enlarging/reducing a character font stored in character font area !5 in the raw form of short line segments, in accordance with the determined magnification. The time for displaying a character on CRT 18 thus is shortened by processing it in the form of short line segments, resulting in the response time for operating the apparatus being shortened. Alternately, to save time, a character may be displayed in the regular size without enlargement/reduction, (for example, in full size), with a notification that a character magnification other than the regular one is being displayed.

A case where a document including characters and character columns whose magnifications are set as above will be described in the following. In the case of printing a document, CPU 9 activates character pattern forming program 14b, and carries out a character pattern forming process in accordance with this program. In detail, CPU 9 reads out document data (character code) stored in document area 12. A character pattern is formed based on the character font data stored in area 15 in accordance with this character code. In this case, CPU 9 judges a character magnification set for a character, following the flow chart shown in FIG. 5. A character pattern is thus formed in accordance with the judgment result.

First, CPU 9 determines if a character modification which exceeds a predetermined magnification limit value regarding the letter is to be carried out by the character pattern formation. This is carried out by comparing data indicative of a character magnification value corresponding to a character code stored in document area 12, with a magnification limit value predetermined in character pattern forming program 14b. In this embodiment, the magnification limit value is set to "6 times". CPU 9 judges if the character magnification value set exceeds the "6 times" for both horizontal and vertical directions in steps A1 and A2. If the character magnification does not exceed the predetermined value as for both horizontal and vertical directions, the character pattern is enlarged/reduced in a first representing mode. Character pattern forming area 13 uses the character magnification to convert the coordinates of the end points of the short line segments. CPU 9 forms a letter pattern using an outline font of the first representing mode represented by approximation using short line segments.

If the character magnification is judged to be over the magnification limit value in step A1 or A2, an outline font of the character pattern is formed in a second representing mode by converting the section which is to be the curved portion of the character pattern into a Bezier curve based on the character font (outline font by approximation using short line segments) stored in character font area 15 in step A4.

An outline font formed by using the Bezier curve as above is formed by the method set forth in the "Bezier Curve Fitting to Planer Figures Approximated By Short Line Segments", Information Process Academy Graphic, and document 38-2 of the CAD study group (document of the meeting on May 12, 1989). In this method, an outline font (line-segment-approximated figure) by short line segment approximation is decomposed into line portions and curved portions, and fits the Bezier curve to curved portions by interpolation represented by a plurality of line segments. It is done by a two step method where the first step assigns an attribute to each vertex of a given polygon based on local information to determine curve or line segments. One or more Bezier curves is fit to the curve segment by estimating using a polygon-approximation model.

When an outline font of the representing mode is changed to the second representing mode using the Bezier curve, it means that a very large magnification is designated. This takes more processing time than the regular case, but the number of characters which can be printed on a page of a sheet is decreased because of this high magnification. Therefore, although it takes more time for processing each character for forming an outline font in the second representing mode, the processing efficiency as a whole is not lowered very much because less characters need be processed.

When an outline font whose curved portion is represented by the Bezier curve, it is enlarged in accordance with the character magnification by converting the coordinates of the control points denoting the curve, as shown in step A3. Then CPU 9 forms the character pattern by using the outline font (of the second representing mode) whose curved portion is represented by the Bezier curve.

Figure 6:
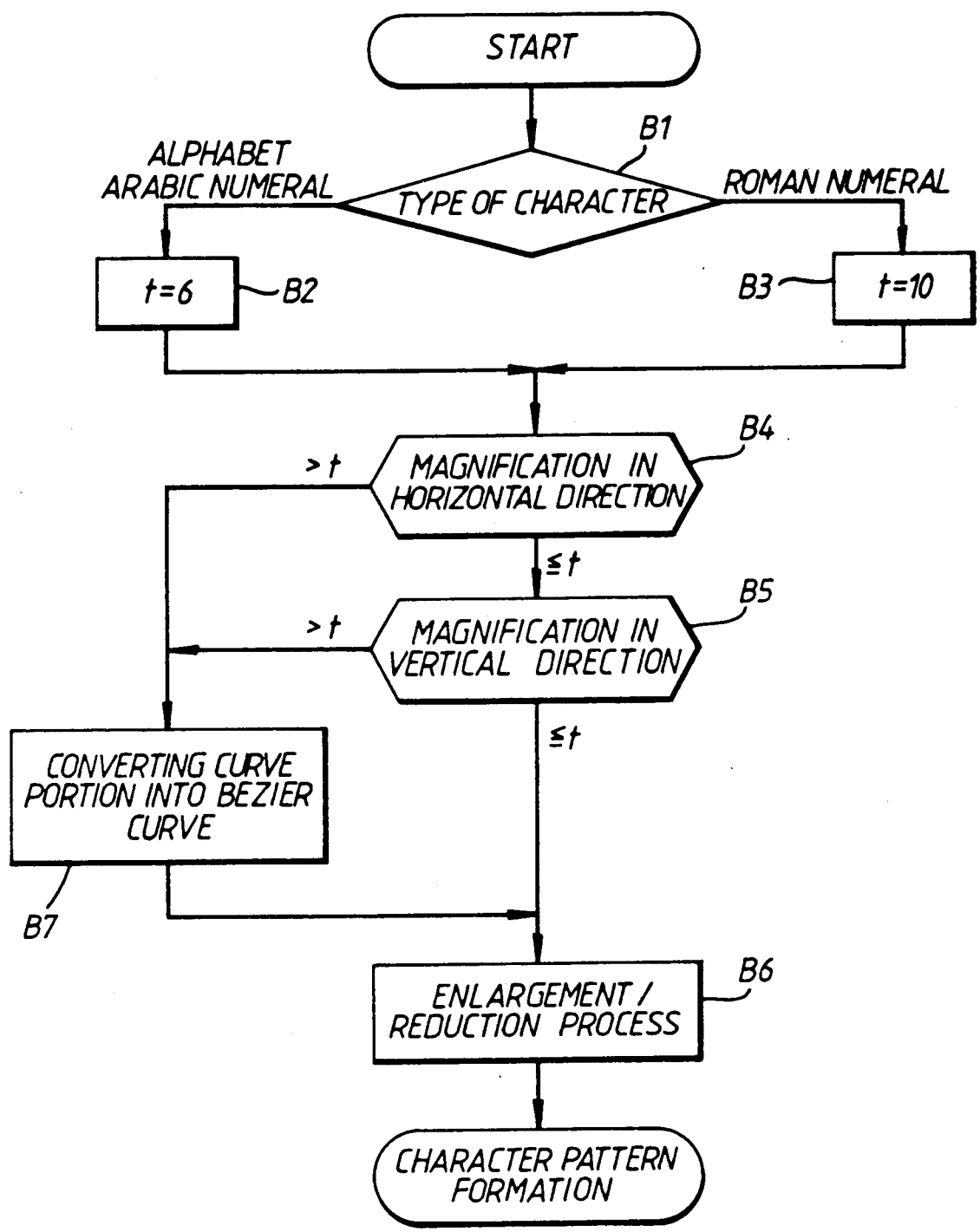

The following is an explanation of the method for setting a magnification limit value, which is for determining which of the first and second representing modes is to be used in representing an outline font used for forming a character pattern, to different values in accordance with a character. For example, it is possible to change a magnification limit value in accordance with the type of character, i.e., Roman numbers (I,II,III, . . . ) which are composed mainly of straight lines, and Arabic numerals (1,2,3, . . . ) which have more curved structures. FIG. 6 is a flow chart showing the process for identifying a character magnification in this method.

First CPU 9 identifies the type of character based on the character code of the character subjected for forming a character pattern (step B1). In this case where the type of the character is identified as an alphabetic character, or an Arabic numeral, magnification limit value t is set to "6 times" at step B2, and if it is identified as being a Roman numeral, the value t is set to "10 times" at step B3. This is because Roman numerals are composed mainly of straight lines and have fewer curved portions, so the character pattern can be formed using an outline font of the first representing mode without deteriorating the quality of the character. Consequently, the magnification limit value can be set higher than those for the alphabetic characters, the Arabic numerals, etc., which have more curved portions. Thus, the number of characters for which character patterns are formed using the outline font of the second representing mode, thereby enabling a high-speed processing.

CPU 9 judges whether or not the character magnification set for the character subjected for forming the character pattern exceeds magnification limit value t, which is set in accordance with the type of the character, as for both the horizontal and vertical directions of the character (steps B4 and B5).

Figure 5:
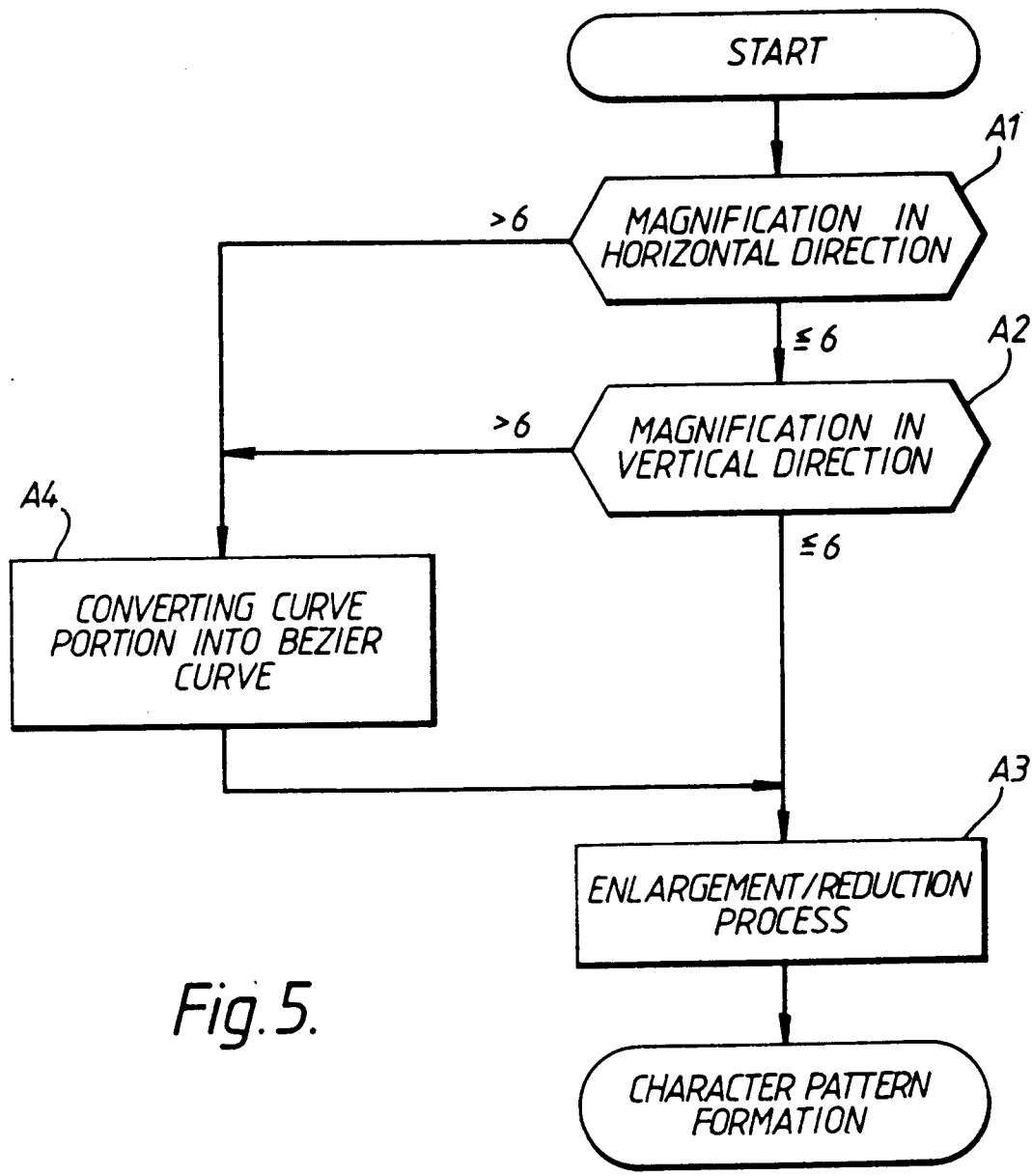
FIG. 5 and FIG. 6 show flow charts illustrating procedures of judgment of character magnification.

From this point on, the same process as the method explained with reference to the flow chart shown in FIG. 5 is carried out. Specifically, when the character magnification is equal to or less than the magnification limit value, the character pattern is formed by enlarging/reducing the character size in accordance with the character magnification using the outline font of the first representing mode (step B6). On the other hand, when the character magnification exceeds the magnification limit value, an outline font of the second representing mode is formed by converting the section of the character pattern (the outline font of the first representing mode) which is to be curved portions into the Bezier curve (step B7). Then, the character size is enlarged in accordance with the character magnification using the outline font, thereby forming a letter pattern (step B6).

The character pattern formed in character pattern forming area 13 is transferred to PRT 2 via PRT-IF 24, to be printed out.

Further in step B!, the character type identification is carried out based on the character code, and a comparison is made of whether the character code represents a straight line character or one which has more curved lines. However, it can be also performed based on a flag which is added to this step for setting a magnification limit value for each font data. With this flag, the magnification limit value for a letter composed of straight lines such as "L" can be set to "10 times", and such a character can be processed in the raw form of short line segments as in the case of the Roman numerals, and the like. Further, a magnification limit value can be set for each character, the decision whether or not it is converted to the outline font of the first mode suitable for high-speed process can be made for each character. Therefore, even when a very large character magnification is set, a character pattern can be efficiently performed without deteriorating the quality of each character.

The magnification limit value used in the embodiment stated above is merely an example of the case where the outline font obtained by approximating the original shape of a character represented in the 200×200 dot size using short line segments is stored in character font area 15. This limit value can be arbitrarily set in accordance with the size of the original shape, and a determination as to how obvious the corners of the connecting points of the short line segments when a character is enlarged.

Thus, according to the present invention, when the character magnification set for each character is judged to be the one designating a very large character size which exceeds the magnification limit value, an outline font represented by short line segment approximation is converted into an outline font whose section which is to be a curved portion is represented by continuous changes in curvature, and a character pattern is formed by using this outline font. Therefore, a high-quality character can be formed at high-speed without increasing the amount of font data even if the character is very much enlarged.

What is claimed is:

1. A document composition apparatus capable of changing outline fonts in accordance with a character magnification, comprising:
    a font memory for storing a character pattern as an outline font in a first representing mode represented by an approximation of plural short line segments;
    setting means for setting a desired character magnification;
    determining means for determining whether the desired character magnification set by said setting means exceeds a predetermined limit value; and
    forming means for forming a size-adjusted character pattern corresponding to said desired character magnification, in accordance with a modified outline font obtained by converting curved portions of said outline font of said first representing mode read from the font memory into a second representing mode represented by following continuous changes in curvature, only when the determining means determines that the desired character magnification exceeds the limit value.

2. An apparatus as in claim 1, wherein said forming means is also for forming a size-adjusted character corresponding to said desired character magnification by magnifying said outline font of said first representing mode without converting to said second representing mode when said determining means determines that the character magnification set by the setting means does not exceed the predetermined limit value.

3. An apparatus as in claim 2, wherein said first representing mode is a mode using short straight line segments to represent all portions of said character pattern and said second representing mode represents curved of said character pattern using Bezier curves.

4. An apparatus as in claim 1, wherein said determining means includes means for determining said limit value.

5. An apparatus as in claim 1, wherein said determining limit value means includes means for receiving an indication of the amount of curved portions in a character and determining a type style of the character, and for setting a magnification limit value in accordance with the amount of curved portions within the character.

6. An apparatus as in claim 5, wherein said receiving means receives a character code which is used to determine the amount of curved portions within said character.

7. An apparatus as in claim 5, wherein said limit value for characters with mostly straight lines is set to be lower than one with characters with many curved lines.

8. A document composition apparatus capable of changing outline fonts in accordance with a character magnification, comprising:
    a font memory for storing a character pattern in the form of an outline font in a first representing mode represented by an approximation of plural short line segments;
    setting means for setting a desired magnification of a character;
    character-type identifying means for identifying a type of a character by determining an amount of curved portions of each character in the outline font in the first representing mode;
    limit value setting means for setting a limit value to a first predetermined magnification when the character type identified by said identifying means includes curved portions above a certain threshold, and to a second predetermined magnification, which is larger than the first predetermined magnification, when there are less curved portions than said certain threshold;
    character magnification determining means for determining if the character magnification set by said setting means exceeds the limit value set by the limit value setting means; and
    forming means for forming a character pattern based on the character magnification set by the setting means, by obtaining said outline font, and converting curved portions of the outline font of the first representing mode read out from the font memory into a second representing mode represented by following continuous changes in curvature, only when the determining means judges that the character magnification exceeds the limit value.

9. An apparatus as in claim 8, wherein said forming means is also for forming a size-adjusted character corresponding to said desired character magnification by magnifying said outline font of said first representing mode without converting to said second representing mode when said determining means determines that the character magnification set by the setting means does not exceed a predetermined limit value.

10. An apparatus as in claim 8, wherein said receiving means receives a character code which is used to determine an amount of curved portions within said character.

11. An apparatus as in claim 8, wherein said limit value for characters with many straight lines are set to be lower than one with characters with many curved lines.

12. An apparatus as in claim 9, wherein said setting means includes a mouse.

13. An apparatus for altering outline fonts in accordance with a desired character magnification comprising:
   font memory means for storing a character pattern as an outline font in a first mode which is represented by approximations of each portion of said character by short line segments;
   means for setting a desired character magnification for said character;
   means for comparing said desired character magnification with a predetermined threshold; and
   output forming means, for forming an output font by reading said stored character pattern, and responsive to said comparing means determining that said magnification is less than said limit value, magnifying said stored outline font as is, and responsive to said comparing means determining that said magnification exceeds said limit value, converting portions of said outline font representing curved portions of said character into Bezier functions representing a continuous changing curvature and magnifying said Bezier functions.

14. A method of changing character magnifications of outline fonts, comprising the steps of:
   storing a character pattern as an outline font in a first representing mode, represented by an approximation of a plural short line segment for each portion of said character pattern;
   determining a desired character magnification for said character pattern;
   determining whether the desired character magnification exceeds a predetermined limit value;
   reading said outline font; and
   when said magnification is determined to exceed said predetermined limit value, converting curved ones of said each portions of said outline font into a second representing mode which is represented by following continuous changes in curvature of said character pattern.

15. A method as in claim 14, comprising the further step of magnifying said character pattern in said first representing mode when said character magnification limit value is not exceeded.

16. A method as in claim 14, wherein said second representing mode represents said curved portions of said characters by Bezier curves.

17. A method of storing an outline font, comprising the steps of:
   receiving a character to be magnified;
   investigating a type of said character to determine an amount of curved lines within said character;
   setting a limit value based on said investigating step to be a lower value for characters with mainly straight lines than for characters which have many curved lines;
   receiving a desired magnification amount;
   determining if said magnification amount is higher than said limit value; and
   storing said outline font in a straight line based system when said magnification amount is lower than said limit value and in a curve based system when said magnification amount is higher than said limit value.

18. A method as in claim 17, wherein said curve based system is a system which stores at least curved portions of said outline font using Bezier curves.

* * * * *